United States Patent [19]
Hibbard

[11] Patent Number: 5,297,503
[45] Date of Patent: Mar. 29, 1994

[54] BIRD FEEDER PROTECTOR

[76] Inventor: Frederick B. Hibbard, P.O. Box 261, Bar Harbor, Me. 04609

[21] Appl. No.: 115,417

[22] Filed: Sep. 1, 1993

[51] Int. Cl.$^5$ .............................................. A01K 39/00
[52] U.S. Cl. ..................................................... 119/57.9
[58] Field of Search ................... 119/57.9, 57.8, 51.01, 119/52.1, 52.2, 52.3, 54, 15, 21, 23

[56] References Cited

U.S. PATENT DOCUMENTS

| | | |
|---|---|---|
| 2,350,187 | 5/1944 | Pfeiffer . |
| 3,041,911 | 7/1962 | Marder . |
| 3,083,687 | 4/1963 | Slaven ............................ 119/57.8 X |
| 3,124,103 | 3/1964 | Stainbrook ........................ 119/52.3 |
| 3,241,525 | 3/1966 | Meier ............................. 119/52.3 X |
| 4,031,856 | 6/1977 | Chester . |
| 4,144,832 | 3/1979 | Dahl . |
| 4,207,839 | 6/1980 | Barry ................................ 119/57.9 |
| 4,523,546 | 6/1985 | Latham ............................. 119/57.9 |
| 4,541,362 | 9/1985 | Dehls . |

FOREIGN PATENT DOCUMENTS 2083992  4/1982  United Kingdom .

Primary Examiner—Thomas Price
Attorney, Agent, or Firm—Daniel H. Kane

[57] ABSTRACT

A bird feeder protector startles and removes unwanted animal intruders from a bird feeding area or bird feeding platform of a conventional bird feeder. A protector mounting base is secured to the bird feeder. A sweeper arm is provided with sufficient length to sweep across the bird feeding area. A mounting spring mounts the sweeper arm on the protector mounting base in a rest position adjacent to the bird feeding area and generally parallel with the bird feeding area. The sweeper arm is positioned to sweep across the bird feeding area upon bending the mounting spring. The mounting spring is selected with a spring constant for restoring the sweeper arm to the rest position. A line is coupled to the sweeper arm for pulling the sweeper arm at a remote viewing location and bending the mounting spring. A line guide guides the line so that the line pulls the sweeper arm across and generally in parallel with the bird feeding area for startling, thumping, and sweeping away unwanted animal intruders on the bird feeding area. The line guide may be formed as a hole through the protector mounting base. The sweeper arm is preferably mounted at a slight angle above the bird feeding area.

16 Claims, 3 Drawing Sheets

BIRD FEEDER PROTECTOR

TECHNICAL FIELD

This invention relates to a new protector for bird feeders for discouraging and removing unwanted intruders such as squirrels and rodents. A manually operated spring loaded sweeper arm is used to "thump", surprise, and sweep away the unwanted visitors from the bird feeding area or bird feeding platform. The bird feeder protector can be manually operated at a remote location such as a house or other viewing location. The invention can be retrofitted on conventional bird feeders having a bird feeding area or platform.

BACKGROUND ART

A variety of "squirrel proof" bird feeders are described in the United States Patent literature. In the Chester U.S. Pat. No. 4,031,856 and the Dehls U.S. Pat. No. 4,541,362, the squirrel proofing mechanisms are operated by the weight of the squirrel or other intruder. In Chester the bird feeding platform is supported on a post. The squirrel is forced to slide back down the post on a counter weighted sleeve actuated by the weight of the squirrel. In Dehls, the weight of the intruder shuts a door over the food in an upright bird feeder. In the Marder U.S. Pat. No. 3,041,911, the weight of a bird on a perch operates a music box.

Other United States Patents described related devices and mechanisms for "spooking" and frightening unwanted visitors to a bird feeder or other forbidden location. For example the Pfeiffer U.S. Pat. No. 2,350,187 describes the use of a bank of air hoses mounted along the eves or ledges of a house. Air passing through the air hoses causes the hoses to sweep continuously back and forth scaring the starlings so they do not nest under the eve. The Dahl U.S. Pat. No. 4,144,832 describes a "bird spook" in which the wind causes a reflecting surface at the end of an arm to sweep back and forth to startle birds. A sweeping motion is also described for the arms of an electric motor operated scarecrow in British Patent Document GB 2,083,992.

All of these devices have in common that they operate automatically either continuously or by the weight of the intruder without human intervention. None of the patents of which Applicant is aware describe a remote control bird feeder protector where a person can watch the bird feeder from a remote location and selectively and manually operate a "spooking" device from the remote location for removing unwanted intruders.

OBJECTS OF THE INVENTION

It is therefore an object of the present invention to provide a bird feeder protector that can be manually operated from a remote location while viewing the bird feeder for selectively "spooking" and removing identified intruders at the time of intrusion.

Another object of the invention is to provide a bird feeder protector capable of "sweeping" across and policing substantially the entire bird feeding area or bird feeding platform of a conventional bird feeder so that unwanted intruders can be surprised, startled, and discouraged from visiting the forbidden area.

A further object of the invention is to provide a spring loaded sweeping arm for "thumping" and removing intruders. The spring loaded sweeping arm can be manually actuated for selective use at a remote viewing location.

DISCLOSURE OF THE INVENTION

In order to accomplish these results the invention provides a bird feeder protector for removing unwanted animal intruders from a bird feeding area or bird feeding platform of a bird feeder. The bird feeder protector is constructed on a protector mounting base secured to the bird feeder. A sweeper arm is provided with sufficient length to sweep across substantially the entire bird feeding area. A mounting spring mounts the sweeping arm on the protector mounting base in a rest position adjacent to the bird feeding area and generally parallel with the bird feeding area. The sweeper arm is positioned to sweep across the bird feeding area upon bending the mounting spring. The mounting spring has a spring constant selected for restoring the sweeping arm to the rest position.

According to the invention a line is coupled to the sweeper arm for pulling the sweeper arm at a remote location and bending the mounting spring. A line guide mounted on the bird feeder guides the line so that the line pulls the sweeper arm across and generally in parallel with the bird feeding area. A feature of the invention is that the manually actuated spring loaded sweeper arm can be used for startling, thumping, and sweeping away unwanted animal intruders on the bird feeding area.

In the preferred example the protector mounting base is a narrow elongate base having the mounting spring and sweeping arm projecting from a side of the narrow elongate base adjacent to one end. The line guide is a hole formed through the narrow elongate base adjacent to the other end. The line is secured to the sweeper arm at approximately for example, less than one third of the distance along its length from the protector mounting base. This leverages a small pulling motion of the line into a larger sweeping motion of the sweeper arm across substantially the entire bird feeding platform.

According to the best mode, the protector mounting base and mounting spring are constructed for mounting the sweeping arm generally parallel to the bird feeding area but at a slight angle above the bird feeding area in the range of for example 1° to 10°. Preferably the sweeping arm is mounted at an angle of approximately 6° above the bird feeding area. The guide hole through the elongate narrow base may therefore also be formed at an angle above the horizontal substantially equal to the angle of the mounting spring and sweeper arm above the bird feeding area.

Other object, features, and advantages of the invention are apparent in the following specification and accompanying drawings.

BRIEF DESCRIPTION OF THE DRAWINGS

FIG. 1A is an isolated view of the feeder protector.

DESCRIPTION OF PREFERRED EXAMPLE EMBODIMENTS AND BEST MODE OF THE INVENTION

Figure 1:
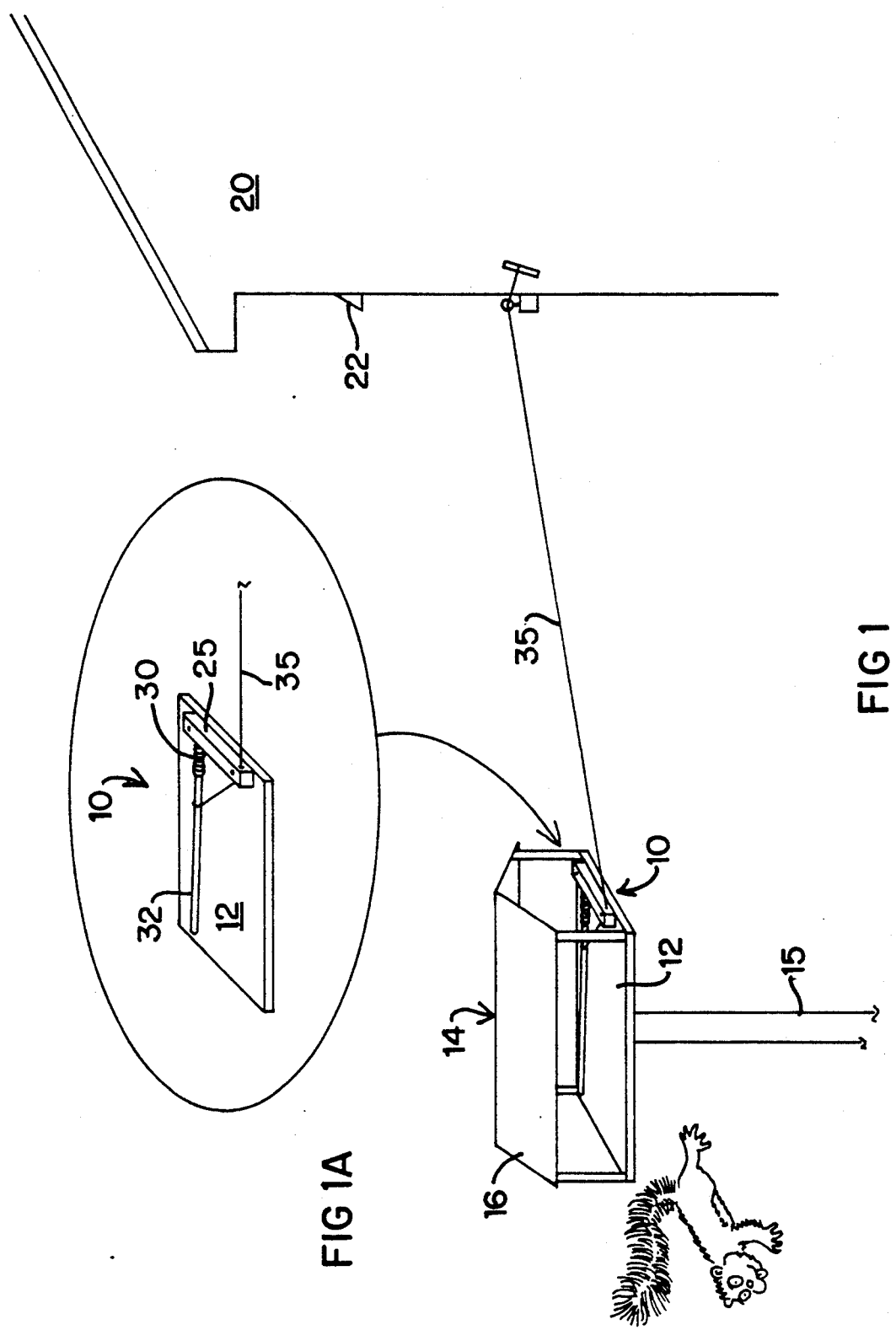
FIG. 1 is a perspective view of the bird feeder protector mounted on a bird feeding area or platform of a bird feeder and actuated from a viewing location at an adjacent house.
Figure 2:
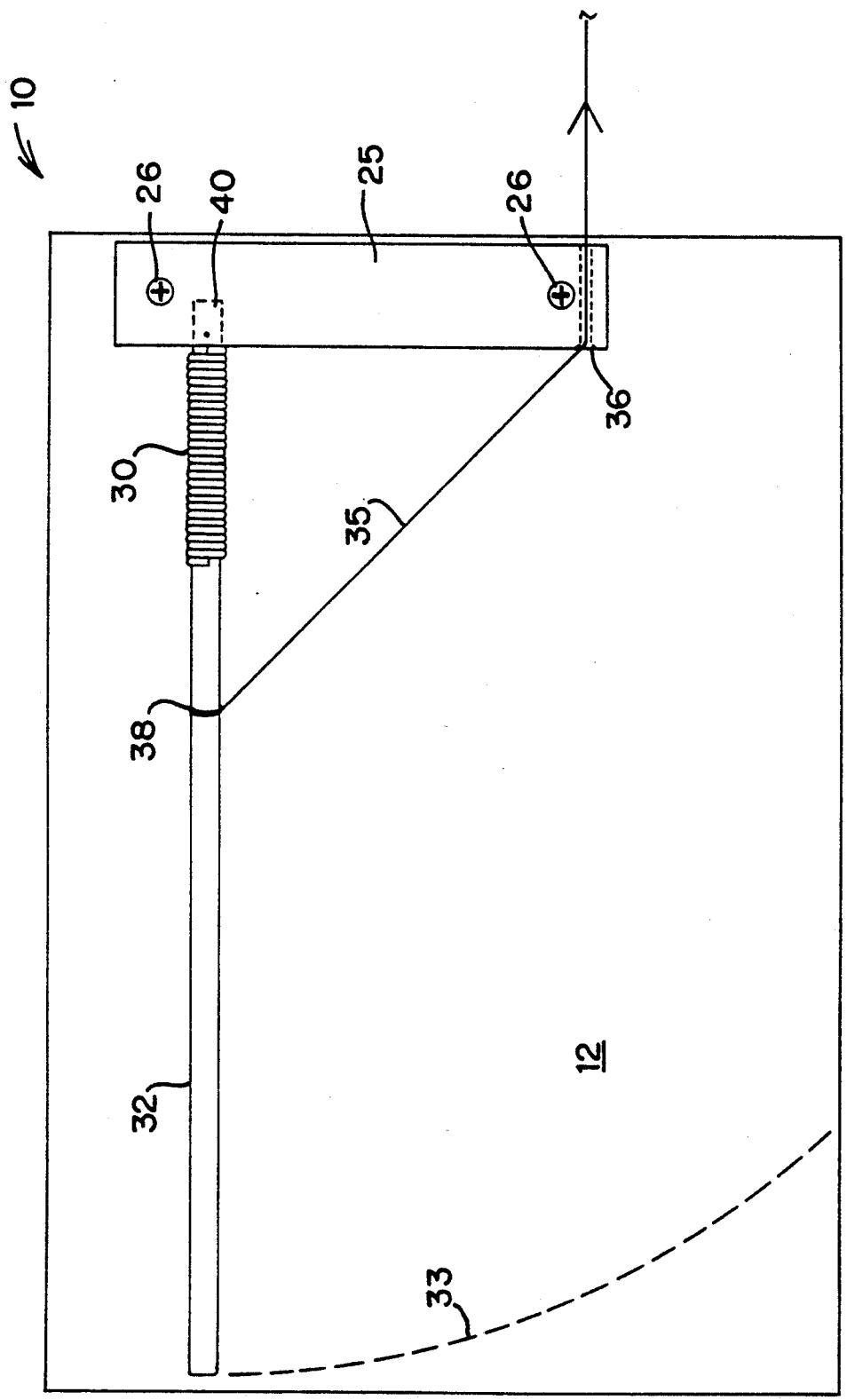
FIG. 2 is a plan view of the bird feeder protector mounted on the bird feeding platform with the bird feeder roof removed.
Figure 3:
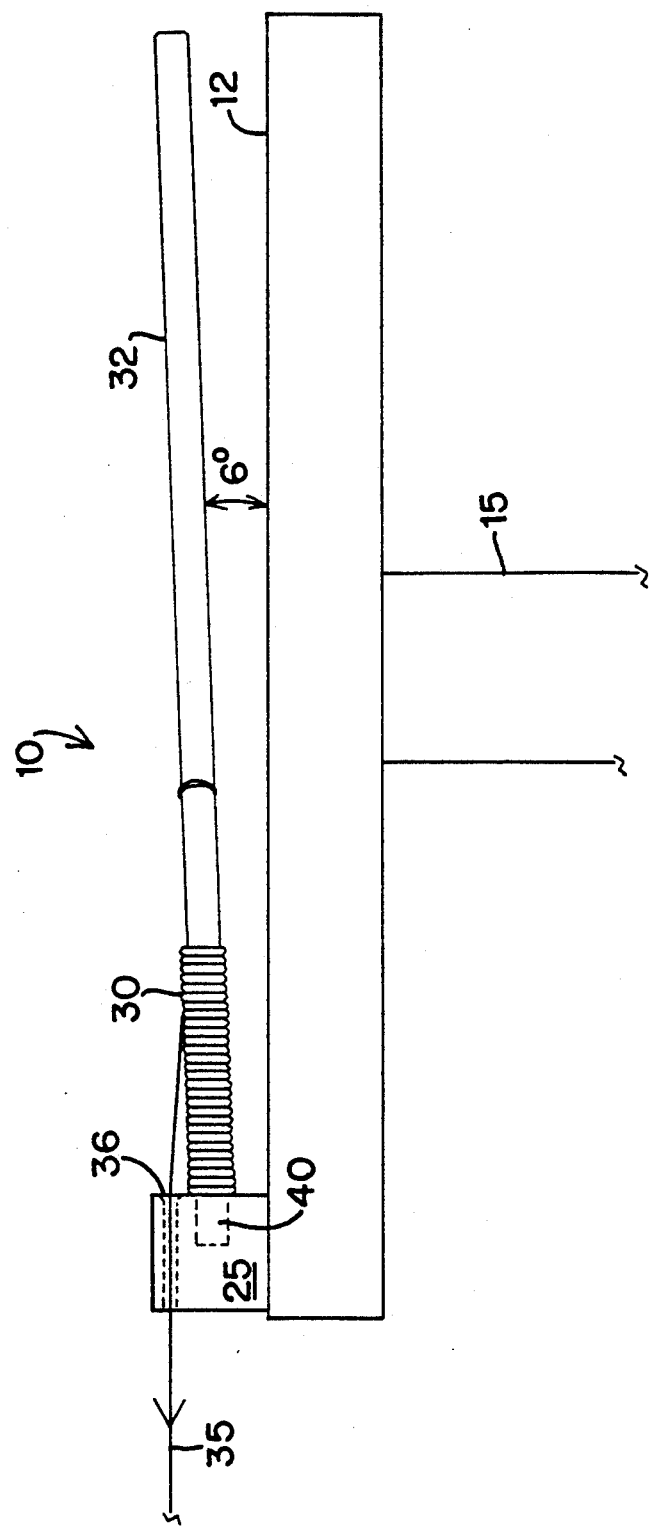
FIG. 3 is a side elevation view of the bird feeder protector mounted on the bird feeding platform with the bird feeder roof removed showing the slight angle between the sweeper arm and platform.

A bird feeder protector 10 is shown installed on a bird feeding platform 12 of a bird feeder 14 in FIGS. 1-3. The bird feeder 14 is of the type mounted on a pole 15 with a protective roof 16 mounted over the bird feeding area defined by the bird feeding platform 12. The bird feed protector 10 is arranged so that it can be manually actuated from an adjacent house 20 by a person viewing the bird feeder 14 from a window 22.

The bird feeder protector 10 is mounted on a protector mounting base 25 in the form of an elongate narrow strip of for example square stock or flat sided dowel. The elongate protector mounting base 25 is in turn secured to the bird feeding platform 12 by screws 26. A mounting spring 30 mounts the sweeping arm 32 on the protector mounting base 25. The mounting spring 30 mounts the sweeper arm 32 at a rest position adjacent to or on the side of the bird feeding area defined by platform 12. From the rest position at the side of the platform 12, the sweeper arm 32 can sweep across substantially the entire bird feeding area as shown by sweep line 33, upon bending of the mounting spring 30. The mounting spring 30 is, for example, a 2 inch (5 cm) door spring with a stiff spring constant for restoring the sweeping arm to the rest position.

A line 35 is coupled to the sweeper arm 32 for pulling the sweeping arm and bending the mounting spring 30 from the remote location for example at the adjacent house 20. The line 35 connected to sweeper arm 32 first passes through a line guide 36 for guiding the line 35 so that the line pulls the sweeper arm across and generally in parallel with the bird feeding area on platform 12. The line guide 36 in the example of FIGS. 1-3 is in fact a hole drilled through the protector mounting base 25 at the end opposite from the mounting spring 30 and sweeper arm 32.

The line 35 is connected to the sweeper arm 32 at a location only a minor fraction of the distance along the sweeper arm 32 from mounting spring 30 and protector mounting base 25. For example the line 35 is generally connected to the sweeper arm 32 at a location less than one third the distance along the length of sweeper arm 32 from the protector mounting base 25. By this arrangement leverage is achieved in sweeping the sweeper arm 32 over the entire bird feeding area with only a small pull along the length of line 35. Furthermore it has been found that if the line 35 is tied to the sweeper arm 32 at a loop 38 which only loosely engages the sweeper arm 32, it will find a natural angle of repose at a location a minor fraction of the distance along the sweeper arm 32.

With respect to further details of construction, the sweeper arm 32 may be for example a length of dowel custom cut for any particular bird feeding platform according to the size of the platform. The sweeper arm dowel 32 is held in mounting spring 30 by insertion into the end of the spring. The size of mounting spring 30 is selected for a tight frictional fit. The mounting spring 30 is in turn held by the stub end of a dowel 40 held by friction and glue in a recess formed in the protector mounting base 26. The stub end of dowel 40 frictionally engages the mounting spring 30.

As shown in FIG. 3 the sweeper arm 32 and mounting spring 30 are preferably mounted in the protector mounting base 25 at a small angle with respect to platform 12 defining the bird feeding area. The slight angle is in the range of for example 1° to 10° and preferably approximately 6°. To this end the recess drilled in the protector mounting base 25 for dowel stub 40 for receiving the mounting spring 30 is formed at the desired angle of for example 6°. Similarly the line guide hole 36 can also be drilled or formed at a comparable angle.

According to an alternative embodiment, the sweeper arm 32 is itself a spring or made of spring like metal or plastic. The spring sweeper arm is bent by pulling on line 35 as heretofore described. The inherent spring constant of the sweeper arm 32 then returns it to the rest position.

The height of the mounting base and sweeper arm above the bird feeding platform can be varied and selected according to the amount of bird seed and other bird food desired to be placed on the platform. In this way the height of the trajectory of the sweeper arm can be set to accommodate the desired quantity of bird seed without disturbing it on the platform. Similarly, the angle of the arm can be adjusted up and down.

While the invention has been described to particular example embodiments it is intended to cover all modifications and equivalents within the scope of the following claims.

I claim:

1. A bird feeder protector for removing unwanted animal intruders from a bird feeding area or bird feeding platform of a bird feeder comprising:

a protector mounting base secured to the bird feeder;

a sweeper arm having a length sufficient to sweep across the bird feeding area;

a mounting spring mounting the sweeper arm on the protector mounting base in a rest position adjacent to the bird feeding area and generally parallel with the bird feeding area, said sweeper arm being positioned to sweep across the bird feeding area upon bending the mounting spring, said mounting spring having a selected spring constant for restoring the sweeper arm to the rest position;

a line coupled to the sweeper arm for pulling the sweeper arm at a remote location and bending the mounting spring;

and a line guide mounted on the bird feeder for guiding the line so that the line pulls the sweeper arm across and generally in parallel with the bird feeding area for startling, thumping, and sweeping away unwanted animal intruders on the bird feeding area.

2. The bird feeder protector of claim 1 wherein the line guide is mounted on the protector mounting base.

3. The bird feeder protector of claim 2 wherein the line guide comprises a hole formed in the protector mounting base.

4. The bird feeder protector of claim 3 wherein the protector mounting base is a narrow elongate base having the mounting spring and sweeper arm projecting from a side of the narrow elongate base adjacent to one end of said base and wherein the line guide is a hole formed through the narrow elongate base adjacent to the other end.

5. The bird feeder protector of claim 4 wherein the line is secured to the sweeper arm at approximately less than one third of the distance along its length from the protector mounting base.

6. The bird feeder protector of claim 5 wherein the sweeper arm is mounted at an angle of approximately 6° above the bird feeding area.

7. The bird feeder protector of claim 4 wherein the protector mounting base comprises an elongate section of dowel formed with a flat on one side secured to the top of the bird feeding area.

8. The bird feeder protector of claim 4 wherein the protector mounting base comprises an elongate section of square stock secured on one side to the top of the bird feeder.

9. The bird feeder protector of claim 1 wherein the protector mounting base and mounting spring are constructed for mounting the sweeper arm generally parallel to the bird feeding area but at a slight angle above the bird feeding area in the range of 1° to 10°.

10. A bird feeder protector for removing unwanted animal intruders from a bird feeding area or bird feeding platform of a bird feeder comprising:
    a protector mounting base comprising a narrow elongate base secured to the top of the bird feeding area;
    a sweeper arm having a length sufficient to sweep across the bird feeding area;
    a mounting spring mounting the sweeper arm on the protector mounting base in a rest position adjacent to the bird feeding area and generally parallel with the bird feeding area, said sweeper arm being positioned to sweep across the bird feeding area upon bending the mounting spring, said mounting spring having a selected spring constant for restoring the sweeper arm to the rest position;
    said mounting spring and sweeper arm projecting from a side of the narrow elongate base adjacent to one end of said base and wherein a line guide includes a hole formed through the narrow elongate base adjacent to the other end;
    a line coupled to the sweeper arm for pulling the sweeper arm at a remote location and bending the mounting spring;
    and said line guide on the protector mounting base for guiding the line so that the line pulls the sweeper arm across and generally in parallel with the bird feeding area for startling, thumping, and sweeping away unwanted animal intruders on the bird feeding area, said line guide comprising a guide hole formed through the narrow elongate base adjacent to other end of said base from the mounting spring and sweeper arm.

11. The bird feeder protector of claim 10 wherein the protector mounting base and mounting spring are constructed for mounting the sweeper arm generally parallel to the bird feeding area but at a slight angle above the bird feeding area in the range of 1 to 10°.

12. The bird feeder protector of claim 11 wherein the guide hole is formed at an angle through the narrow elongate base above the bird feeding area, said angle being substantially equal to the angle of the mounting spring and sweeper arm above the bird feeding area.

13. The bird feeder protector of claim 10 wherein the sweeper arm is mounted at an angle of approximately 6° above the bird feeding area.

14. A bird feeder protector for removing unwanted animal intruders from a bird feeding area or bird feeding platform of a bird feeder comprising;
    a mounting base secured to the bird feeder;
    a spring loaded sweeper arm having a length sufficient to sweep across the bird feeding area, said sweeper arm being mounted on the mounting base and being positioned to sweep across the bird feeding area upon bending the sweeper arm;
    a line coupled to the sweeper arm for bending the sweeper arm at a remote location;
    and a line guide for guiding the line so that the line pulls the sweeper arm across the bird feeding area for startling, thumping, and sweeping away unwanted animal intruders on the bird feeding area.

15. The bird feeder protector of claim 14 wherein the mounting base is constructed for mounting the sweeper arm generally parallel to the bird feeding area but at a slight angle above the bird feeding area in the range of 1° to 10°.

16. The bird feeder protector of claim 15 wherein the sweeper is mounted at an angle of approximately 6° above the bird feeding area.

* * * * *